United States Patent

Underys

Patent Number: 5,827,376
Date of Patent: Oct. 27, 1998

[54] MOLDS FOR PLASTIC PROTOTYPING AND ISOTHERMAL FORGING OF ALUMINUM, STEEL THEREFOR, AND METHOD OF MANUFACTURING THEREOF

[75] Inventor: Algirdas A. Underys, Arlington Hts, Ill.

[73] Assignee: A. Finkl & Sons Co., Chicago, Ill.

[21] Appl. No.: 684,502

[22] Filed: Jul. 19, 1996

[51] Int. Cl.$^6$ .............................. C22C 38/16; C21D 7/06
[52] U.S. Cl. ........................... 148/328; 148/332; 420/92; 75/512; 75/568
[58] Field of Search ................................ 148/328, 332; 420/92; 75/512, 568

[56] References Cited

U.S. PATENT DOCUMENTS 3,824,096  7/1974  Asada et al. .............................. 420/92

FOREIGN PATENT DOCUMENTS 57-28722  6/1982  Japan ...................................... 75/512
1054098  1/1967  United Kingdom .................... 420/92

*Primary Examiner*—Deborah Yee
*Attorney, Agent, or Firm*—James G. Staples

[57] ABSTRACT

A plastic industry prototype mold and steel therefor having machining speed and weldability characteristics competitive with aluminum alloys, and a method of manufacture thereof, said composition containing C 0.05–0.35, Mn .50–1.50, P 0.025×, S 0.100×, Si 0.50×, Ni 0.35–0.75, Mo 0.30–0.70, Cu 0.75–1.50, Al 0.20× and Fe bal.

20 Claims, 5 Drawing Sheets

Weldability Diagram

1. C .48/.53, Ni .80/1.0, Cr. 1.0/1.3 Mo .4/.55
2. C .40/.44, Ni .7/.9, Cr. 2.35/2.85 Mo .9/1.1
3. C .37/.42, Ni .45x, Cr. 5.0/5.5, Mo 1.2/1.75, V .88/.92

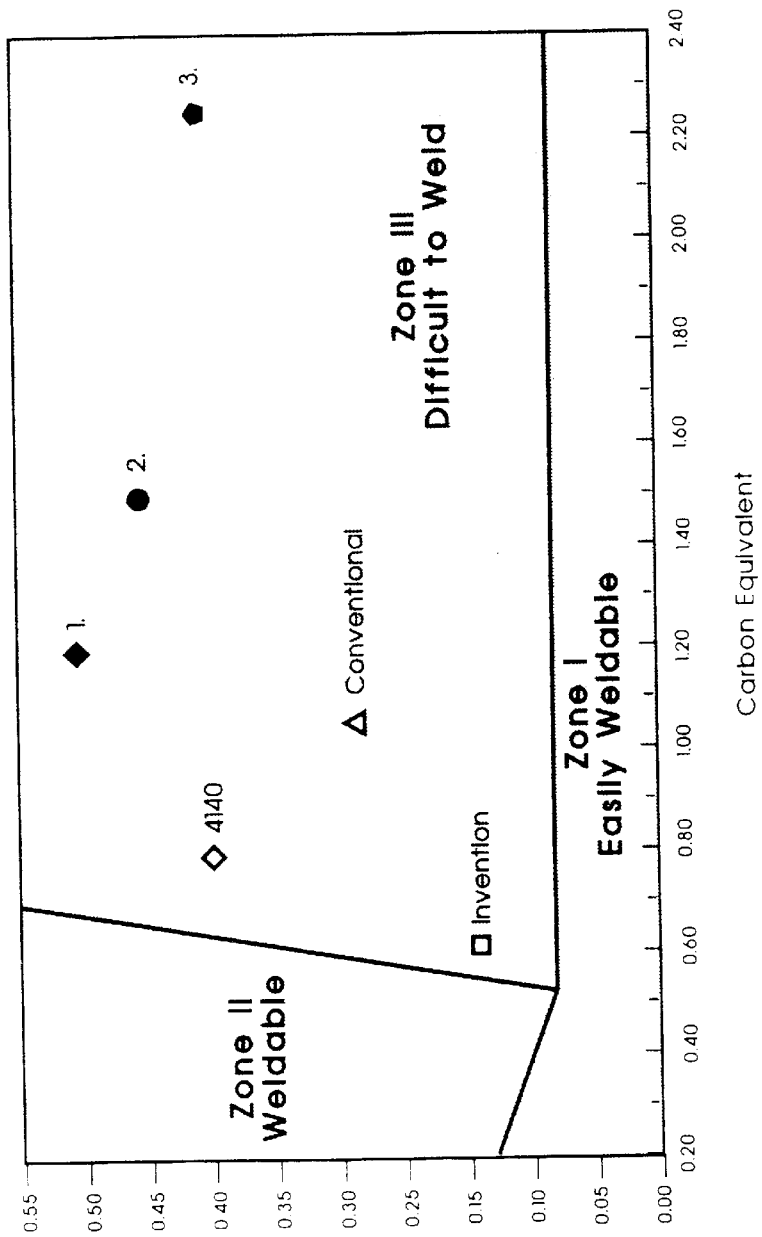

MOLDS FOR PLASTIC PROTOTYPING AND ISOTHERMAL FORGING OF ALUMINUM, STEEL THEREFOR, AND METHOD OF MANUFACTURING THEREOF

This invention pertains generally and primarily to plastic molding and more specifically to molds for plastic injection molding and steel therefor which may be used in prototyping, an application currently almost universally met by the use of aluminum alloys. The invention further pertains generally to molds for, and methods of, isothermal forging of aluminum.

BACKGROUND OF THE INVENTION

This invention pertains to the plastic industry in many, if not a majority, of its iterations, of which plastic injection molding is a very significant component. To illustrate the new role which the instant invention plays in this large industry, the toy industry, which is a large industry by itself, will be used for the purposes of illustration and description.

The development of a new plastic toy goes through a number of evolutionary steps which may be generally, though not necessarily always, described as follows.

Following a market survey which can take many forms and which may involve the use of even hand carved samples, a preliminarily preferred embodiment of the toy is proposed. Thereafter a limited market test involving a few hundreds, or, more likely, a few thousands of the preliminarily approved designs are prepared for controlled market exposure and consumer testing, as by being offered to retail customers through selected test retail outlets. After observing the trade reception of the preliminarily preferred design of the toy, modifications often are made. Frequently the modified toy is again market tested. If market testing is successfully concluded, the toy maker then prepares for mass production.

In preparing for mass production the toy manufacturer often uses a steel of the P-20 class for the final production molds. A steel of the following approximate composition of this general class has been widely used for such mass production molds: C 0.33, Mn 0.80, Si 0.45, Ni 0.40, Cr 1.80, Mo 0.45. This steel will sometimes hereafter be referred to as the conventional steel.

Although this steel, which is a premium grade of the P-20 class, produces excellent molds which give highly satisfactory production performance, it has certain drawbacks, primarily associated with machining requirements. Specifically the steel must be machined on the conventional large machine tools used in the steel machining industry today, which machine tools have a relatively slow spindle speed in terms of rpm. Thus the toy maker, who needs a few hundred or a few thousand prototype pieces made on a prototype mold, must wait an undesirably long time while the rather lengthy mold making process using the above described steel industry machine tools takes place, assuming the prototype mold maker uses the conventional steel.

Another disadvantage of the conventional steel from the manufacturer's point of view is that the production of prototype molds for the few hundreds or few thousands of prototype marketing sample toys cannot be economically made with the conventional steel. A significant contributing factor to the economies of the project is again the aforesaid speed of machining, once a designer has come up with a preliminarily approved design it is imperative to convert the design concept into a prototype mold quickly because selling seasons are short, there are intense competitive pressures in the marketplace, and the life cycles of many toys are so short the designers often work on very, very tight time schedules. The aforementioned slow machining characteristics of the conventional steel therefore, from a business/economic standpoint, rules out the use of the conventional material. As a consequence the toy maker, of necessity, has prototype molds made from a less durable but fast machining aluminum alloy, which material is quite acceptable for the production of a few thousand parts for market testing. The steel mold maker therefore, loses the prototype mold business to an aluminum alloy prototype mold competitor.

A further disadvantage of the conventional material is the fact that it is difficult to weld. Frequently field market testing preceding full production discloses that modifications should be made in the toy, and hence modifications in the prototype mold, and the product may be retested before final release for production. Such modifications may involve adding a section of material to the prototype mold, and thereafter machining it. Material is usually added by welding, and the conventional material, since it contains C considerably in excess of 0.20, is difficult to weld, and hence the mold modification process is both difficult and time consuming. Often the toy manufacturer wants to put product into the hands of his retail customers within 6–8 weeks after market testing indicates a salable product has been developed, and this very short time frame is simply not achievable by the ordinary mold shop which is limited to use of the conventional mold material on the slow spindle speed machines which are currently found in said mold shops.

There is thus a need for a mold made from steel which can be quickly machined on the existing machine tools currently found in the production mold shops, which machines are set up to do the above described type of manufacturing (and which represent a large capital investment), and which can be quickly and easily welded to produce successive mold iterations so as to respond to design changes dictated by field testing.

A non-related but long existing need is the demand for a steel which is suitable for isothermal forging of aluminum at temperatures on the order of about 800° F.

SUMMARY OF THE INVENTION

The invention is a prototype mold made from steel for the plastic industry which is competitive, from a cost, machining speed and welding standpoint, to plastic industry prototype molds made from aluminum alloys, so that the ordinary production mold maker can make prototype molds as well as production molds, and therefore obtain access to a larger market than he currently is limited to by the characteristics of the plastic injection mold steel which has been available until this time.

The invention also pertains to a steel composition equally well suited to the production of both prototype steel molds for the plastic industry as well as long run, production molds for said industry. The invention further contemplates a method of making the above described molds.

It should also be noted that due in some measure to the fact that the steel of the invention weakens only slightly when put into use under elevated operating temperatures, said steel is, with only modest or no modification, also very suitable for isothermal forging applications.

Another goal of the invention is to provide a dual purpose steel which, with little or no modification either in composition or processing (heat treatment, etc.), is eminently usable for such widely divergent applications as prototype molds and isothermal forging.

BRIEF DESCRIPTION OF THE DRAWING

The invention is partially presented in the accompanying drawing in which:

FIG. 5 is a weldability diagram comparing the weldability of the product of this invention against other products which are available for use, or have been used, for the purposes to which the product of the instant invention is directed.

DETAILED DESCRIPTION OF THE INVENTION

Figure 1:
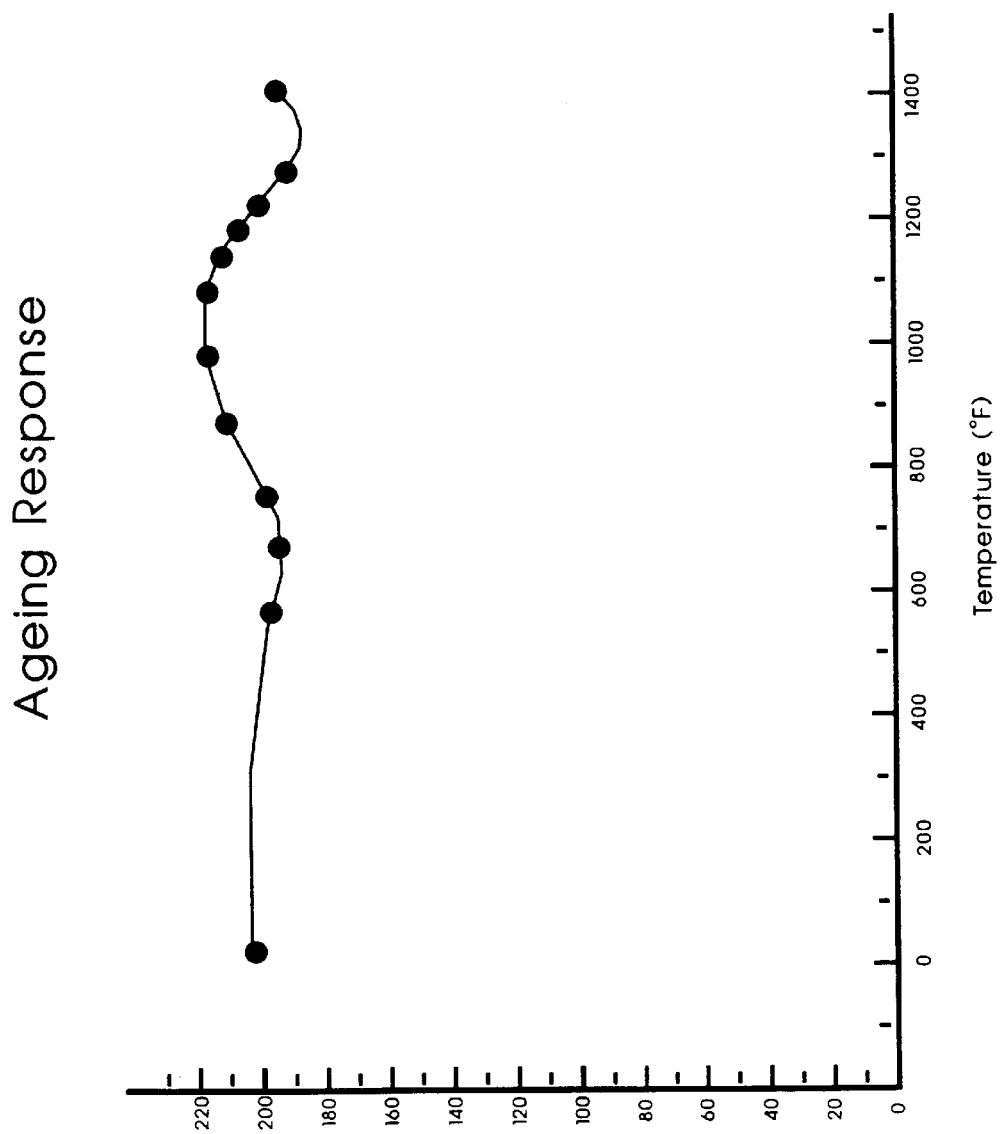
FIG. 1 is an ageing response curve of the product of the present invention.

Molds for plastic prototype part production must be machinable at high speeds in order to meet the very short time period requirements in the plastic parts industry generally, and the plastic toy industry in particular, and they must also be readily welded in order to quickly accommodate changes in the configuration of the plastic part to be made on production molds, including changes indicated by market testing using prototype samples. And both of these requirements, when using steel alloys for such molds, must be economically competitive with generally less expensive industry alternatives, such as aluminum alloys. A steel composition which meets the foregoing requirements is hereafter set out in its broad, intermediate and most preferred form as follows:

|    | Broad     | Intermediate | Preferred  |
|----|-----------|--------------|------------|
| C  | .05–.35   | .15–.20      | .15–.20    |
| Mn | .50–1.50  | .60–.80      | .60–.80    |
| P  | .025 max  | .025 max     | .015 max   |
| S  | .100 max  | .010–.025    | .010–.020  |
| Si | .50 max   | .15–.35      | .15–.35    |
| Ni | .35–.75   | .40–.60      | .40–.50    |
| Mo | .30–.70   | .43–.57      | .43–.57    |
| Cu | .75–1.50  | .85–1.15     | .85–1.15   |
| Al | .20 max   | .03–.15      | .03–.09    |
| Fe | bal       | bal          | bal        |

Although C up to 0.35 can be tolerated if the mold maker is skilled at welding steels in the mid-carbon range, it is preferred that C be limited to 0.20 since carbon levels above 0.20 make welding without preheating and post-heating quite difficult. An absolute minimum 0.05 C must be present to ensure substantial attainment of the strength and other characteristics hereafter mentioned, and it is preferred that a minimum of 0.15 be present to ensure attainment of said hereafter described characteristics. Although 0.15 to 0.20 is a rather narrow range it can be consistently achieved in quality melt shops.

Mn is necessary as a deoxidizer in the steel making process. It also functions to control sulfides in the forging operations used in the production of a mold block. If less than about 0.50 Mn is present the desired sulfide control may not be attained. If more than about 1.50 Mn is present hot working problems in the post-melting forging operations will arise. To ensure attainment of the desired objectives without undue risk of the above described shortcomings, a more preferred range is 0.60–0.80. It should also be noted that Mn also materially contributes to the solubility of Cu in liquid iron which is highly desired in both prototype mold and isothermal forging applications.

P aids machinability, an important requirement, by facilitating chip breakage. However P is detrimental to physical properties such as ductility and impact strength. For these reasons P should be present in an amount no greater than 0.025, and preferably no greater than 0.015.

S, like P, aids machinability by facilitating chip breakage. However it is detrimental to physical properties such as ductility and impact strength. Since ease of machinability is an important characteristic of the product of the invention, S up to 0.100 max can be tolerated, particularly if Mn is present in or near the upper third of its range. As a practical matter S at such a high level will seldom be required and hence the desired properties may be attained if 0.025, or less, is present, so, up to 0.025 is preferred. However nearly universally satisfactory results can be obtained at levels up to 0.020. At least 0.010 must be present to attain an acceptable level of machinability.

Si must be used for its deoxidizing capability in the steel making process. Of equal or even greater importance however is the fact that Si increases the solubility of Cu in iron. Si also increases the time for precipitation hardening. Taking the above factors into account, Si should be limited to a maximum of 0.50, and preferably should be limited to the range of from about 0.15–0.35. It will be noted that if less than about 0.15 Si is present the desirable characteristics may not be attained.

Ni increases the solubility of Cu in liquid iron. Ni is also required to control surface cracking during forging. Accordingly, Ni preferably is present in an amount from about one-third to one-half the quantity of copper. At least 0.35, and preferably at least about 0.45 is present in order to raise the melting point of the copper rich alloy that forms on the surface of the piece during the heating and forging steps. It should be noted that when copper bearing steels oxidize, Cu migrates to the grain boundaries which is deleterious to the desired characteristics. Ni counteracts this migration tendency and is absolutely essential if the mold block is to be forged, which it nearly invariably is. Since Ni at the present time is an expensive element and the desirable attributes of Ni can be attained when about 0.70 is present, this is an upper limit. If the steel maker follows good practices very acceptable results can be obtained at an upper level of 0.60, and even at 0.50.

Mo improves the impact resistance of Cu bearing steels. This fact is especially important if the eventual product is a forging die, such as an isothermal forging die. At least about 0.30 Mo must be present to achieve the desired properties, but no more than about 0.70 need be present to achieve said properties. Acceptable results will be attained when Mo is present in the range of from about 0.43–0.57.

Cu is an important element and an aim amount is 1.00. Steels containing more than 0.75 copper respond to precipitation hardening when re-heated to 800° to 1200° F. Copper increases the fluidity of molten steel. One percent copper has the same effect on molten steel fluidity as 125° F. raise in temperature. Copper improves mechanical properties such as yield to tensile ratios, ductility, impact resistance, machinability, and corrosion resistance. The maximum solubility of copper in iron at room temperature when quickly cooled is 1.50 percent. Increase in hardness is negligible for copper contents greater than 1.50 percent. The maximum solubility of copper in iron at room temperature when slowly cooled is 0.35 percent. For these reasons Cu should be present in the range of 0.75–1.50, and, most preferably, at 0.85–1.15 with the aforesaid aim of 1.00.

Al is an important deoxidizer in the steel making process. In addition, it appears to improve the notch impact strength of copper bearing steels. For these reasons, Al should be present in an amount up to 0.20 max, and preferably is present in the range of about 0.03–0.15 and, most preferably, from about 0.03–0.09.

It should also be noted that the steel from which the product of this invention is made is preferably made by the vacuum arc degassing process. In this process a heat of molten steel which has been melted to the above ranges, with the possible exception of Al, is, after furnace melting and pre-vacuum treatment, subjected to the effects of a vacuum, a purging gas passed upwardly through the heat, and an alternating current electric heating arc. As those skilled in the art will appreciate said processing steps can advantageously be performed simultaneously, or otherwise. For example, the heat may initially be subjected to a vacuum on the order of about 1 mm Hg, or less, with a gas which is inert with respect to the steel, such as Ar, purged upwardly during the vacuum exposure. It will be understood that an important purpose of the vacuum is to lower the H and, to some extent, the 0 and N, values to very low levels. The combined vacuum-purging treatment can then be followed by subjection to the AC heating arc. Alternatively the arc may be struck as soon as the heat is sealed in the vacuum environment and continued while the simultaneous subjection to vacuum and purging gas is maintained. It will be understood that the primary purpose of the AC heating arc is to ensure that the steel will exit the post-melting vacuum treatment station at a temperature suitable for teeming, such as about 2850°–2900° F. For further information, reference is made to U.S. Pat. No. 3,501,289, the disclosure of which is incorporated herein by reference. It will be noted that aluminum is preferably added after vacuum treatment and most preferably after the processing at the vacuum station is complete and just prior to teeming.

For selected end products, such as those required to take a high polish, the molten steel, following the above described vacuum arc de-gassing treatment, may be subjected to a subsequent vacuum arc remelt process to yield a product having optimum cleanliness. As exemplary of this treatment reference is made to U.S. Pat. No. 5,252,120, the disclosure of which is incorporated herein by reference.

A small heat of the steel of this invention was made as set out below. The ingot made was 3" in diameter, and approximately 16 pounds in weight. The material was heated to 1922° F. (1050° C.) and extruded into a 1" diameter rod (approximately 9 to 1 reduction).

|    | Actual |
|----|--------|
| C  | .15    |
| Mn | .47    |
| P  | .003   |
| S  | .004   |
| Si | .32    |
| Ni | .46    |
| Mo | .52    |
| Cu | .86    |
| Al | .14    |

|    | Actual |
|----|--------|
| Fe | balance, including incidental impurities and additional elements which do not deleteriously affect the foregoing characteristics |

Four groups of tensile and charpy blanks were prepared from this material and heat treated in the lab. All four groups were solution treated at 1750° F. for one hour. Two samples were water quenched. The remaining two were air cooled. The two water quenched samples were aged at 1000° F. and 1150° F. for three hours. The air cooled samples were also aged at 1000° F. and 1150° F. for three hours. The testing results are as follows:

| Water Quenched | | | | | | | |
|---|---|---|---|---|---|---|---|
|  | BID | BHN | Yield | UTS | RA | Elong | Charpy |
| 1000° F. | 3.99 | 230 | 90550 | 111850 | 66.8 | 24.0 | 108 |
| 1150° F. | 3.92 | 239 | 93950 | 111600 | 62.9 | 19.5 | 109.5 |

| Air Cooled | | | | | | | |
|---|---|---|---|---|---|---|---|
|  | BID | BHN | Yield | UTS | RA | Elong | Charpy |
| 1000° F. | 4.12 | 215 | 81900 | 104650 | 63.7 | 23.5 | 65 |
| 1150° F. | 4.16 | 211 | 78700 | 99650 | 68.1 | 26.5 | 119.5 |

To create an ageing response curve, eleven samples were solution treated at 1750° F., air cooled, and then aged at 600° F., 700° F., 800° F., 900° F., 1000° F., 1100° F., 1200° F. (two samples), 1250° F., 1300° F. and 1400° F. for three hours. Three hardness values from samples used for physical testing were also added to the ageing response curve. The ageing response of the material was as follows:

|  | BID | BHN |
|---|---|---|
| before age | 4.30 | 197 |
| 600° F. | 4.33 | 194 |
| 700° F. | 4.38 | 189 |
| 800° F. | 4.32 | 195 |
| 900° F. | 4.13 | 214 |
| 1000° F. | 4.12 | 215 |
| 1000° F. | 4.09 | 218 |
| 1100° F. | 4.13 | 214 |
| 1150° F. | 4.16 | 211 |
| 1150° F. | 4.13 | 214 |
| 1200° F. | 4.17 | 210 |
| 1200° F. | 4.15 | 212 |
| 1250° F. | 4.23 | 203 |
| 1300° F. | 4.38 | 189 |
| 1400° F. | 4.34 | 193 |

An ageing response curve of the steel of this invention is shown in FIG. 1.

To evaluate the hot tensile strength, two samples were solution treated at 1750° F., air cooled to room temperature, and aged at 1150° F. for three hours. The hardness of the samples were 214 HB (4.13 B.I.D.) and 212 HB (4.15 B.I.D.) which correlates well with the ageing response curve. The samples were tested at 750° F. and 900° F. after a soak time of 30 minutes. The properties are as follow:

| Test Temperature | Yield Strength | Ultimate Strength | Elongation | Reduction of Area |
|---|---|---|---|---|
| 750° F. | 68,500 | 85,061 | 17.0% | 76.6% |
| 900° F. | 63,182 | 75,988 | 25.0% | 78.1% |

Figure 2:
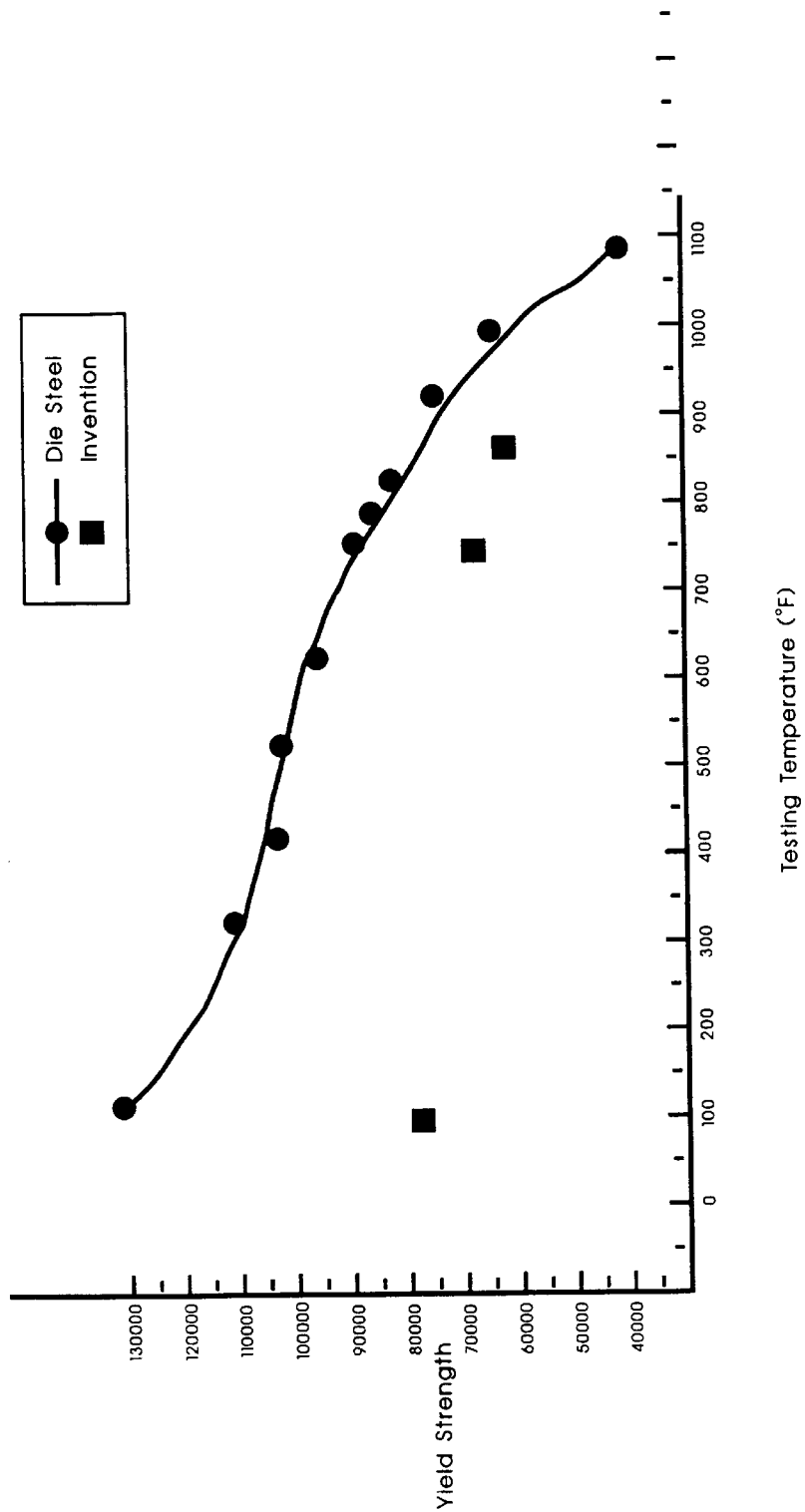
FIG. 2 is a hot yield strength curve of the product of the present invention compared to a well known steel which has been used for similar end applications.

The drop in yield at 750° F. was only 13% of its room temperature yield strength. In comparison, a widely used hot work 0.55 C die steel yield strength drops 32% compared to its room temperature values. In addition, the yield strength of the invention steel is only 20% less than the aforesaid widely used hot work die steel at a testing temperature of 750° F. It will be seen from these results that the resistance to softening at elevated temperatures allows the steel of this invention to be a viable steel for isothermal forging applications as well as prototype mold applications. A graph of the yield strength versus testing temperature for said widely used 0.55 C hot work die steel and the steel of this invention is shown in FIG. 2.

The foregoing samples indicated that the material could be promising mold material and isothermal forging die steel. To verify these observations, a commercial sized heat was cast with the following chemistry:

| | |
|---|---|
| C | .15 |
| Mn | .78 |
| P | .012 |
| S | .015 |
| Si | .21 |
| Ni | .48 |
| Mo | .43 |
| Cu | .95 |
| Al | .09 |

Five 30 inch ingots were cast. Two jobs were forged from two separate ingots. The as forged size was 9"×22"×150". The jobs were water quenched from 1750° F., and over-aged at 1150° F.

A tensile and charpy core were obtained from the 9"×22"×150" piece. The results of the longitudinal test as well as the data from the ORNL samples were as follows:

| Production Core - Water Quenched, Aged at 1150° | | | | | | |
|---|---|---|---|---|---|---|
| | BID | BHN | Yield | UTS | RA | Elong | Charpy |
| 1" Below Surface | 3.91 | 240 | 93200 | 109600 | 60.7 | 23.5 | 62, 59,59 |

| ORNL Sample - Water Quenched | | | | | | |
|---|---|---|---|---|---|---|
| | BID | BHN | Yield | UTS | RA | Elong | Charpy |
| 1150° | 3.92 | 239 | 93950 | 111600 | 62.9 | 19.5 | 109.5 |

The longitudinal production core has nearly identical properties as the laboratory heat treated samples.

Further investigation confirmed that the steel of the present invention has greater machinability than the conventional steel, a low hardness drop-off from surface to center in thick sections, excellent strength and ductility, excellent weldability, good polishability, and a thermal expansion very similar to the conventional steel. This latter feature is of importance since, should circumstances dictate that the final production molds are to be made from the conventional steel, the design of the final production mold can assume the same geometry when designing the production mold as was used in designing the prototype mold.

In connection with the foregoing it should be noted that the steel has minimal hardness drop-off in thick cross section and is less sensitive to the effects of welding than martensitic grades due to its precipitation hardening characteristic. As earlier indicated, Cu is the primary element involved in precipitation hardening reactions. Specifically, Cu improves yield to tensile ratios, improves ductility and improves impact resistance.

It will further be noted that machinability can be improved by decreasing hardness and adding alloys that facilitate machining. When Cu and S are added to the steel of the present invention, excellent machinability is attained at a BHN hardness of 248. Specifically, and considering axial milling, the steel of the present invention can be machined 2.8 times faster than the conventional steel with the same tool life. Further, when the steel of the present invention is machined at twice the speed of conventional steel, the increase in tool life is five fold of the new steel compared to the conventional steel. In addition, the tool geometry and inserts that are normally used to machine the conventional steel can be used in machining the new steel without sacrificing machining efficiency. As is well known in the art, special tool geometry and inserts must be used to machine aluminum so that the production of tooling for mass production of toys requires two sets of tool geometry and inserts when prototype molds are made from aluminum alloy, and production molds from steel alloy.

Figure 3:
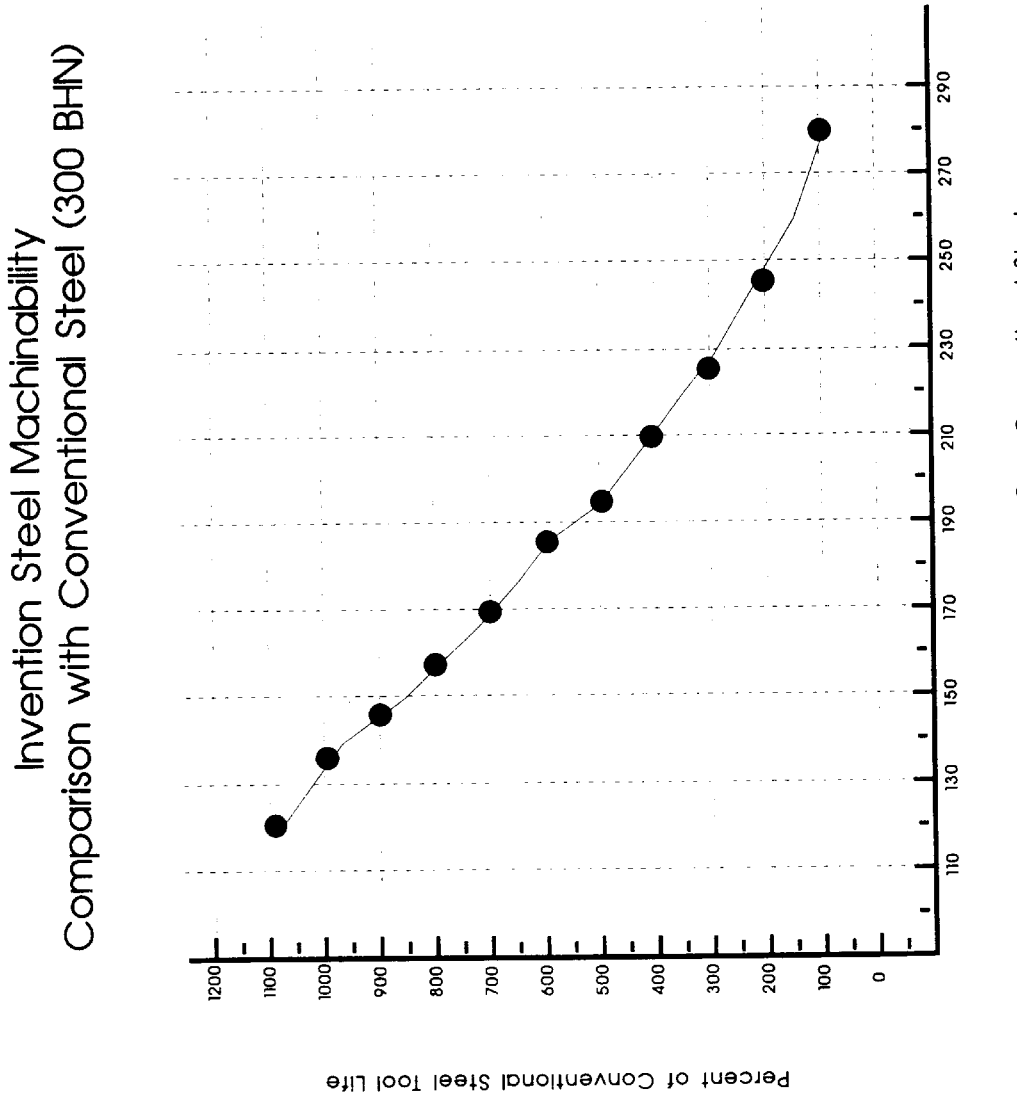
FIG. 3 is a machinability comparison of the product of the present invention against a conventional steel which is used for some of the applications for which the product of the instant invention is particularly well suited.

The above mentioned dramatic increase in machinability can be appreciated from FIG. 3 which plots the increased tool life experienced with the use of the steel of this invention against the tool life of the conventional steel in terms of the percent of increase of the machining speed of the steel of the invention against the machining speed of the conventional steel.

A further outstanding characteristic of the present invention over the conventional product is the high consistency of hardness from surface to center of large sections achieved with the present invention as compared to the conventional product.

Figure 4:
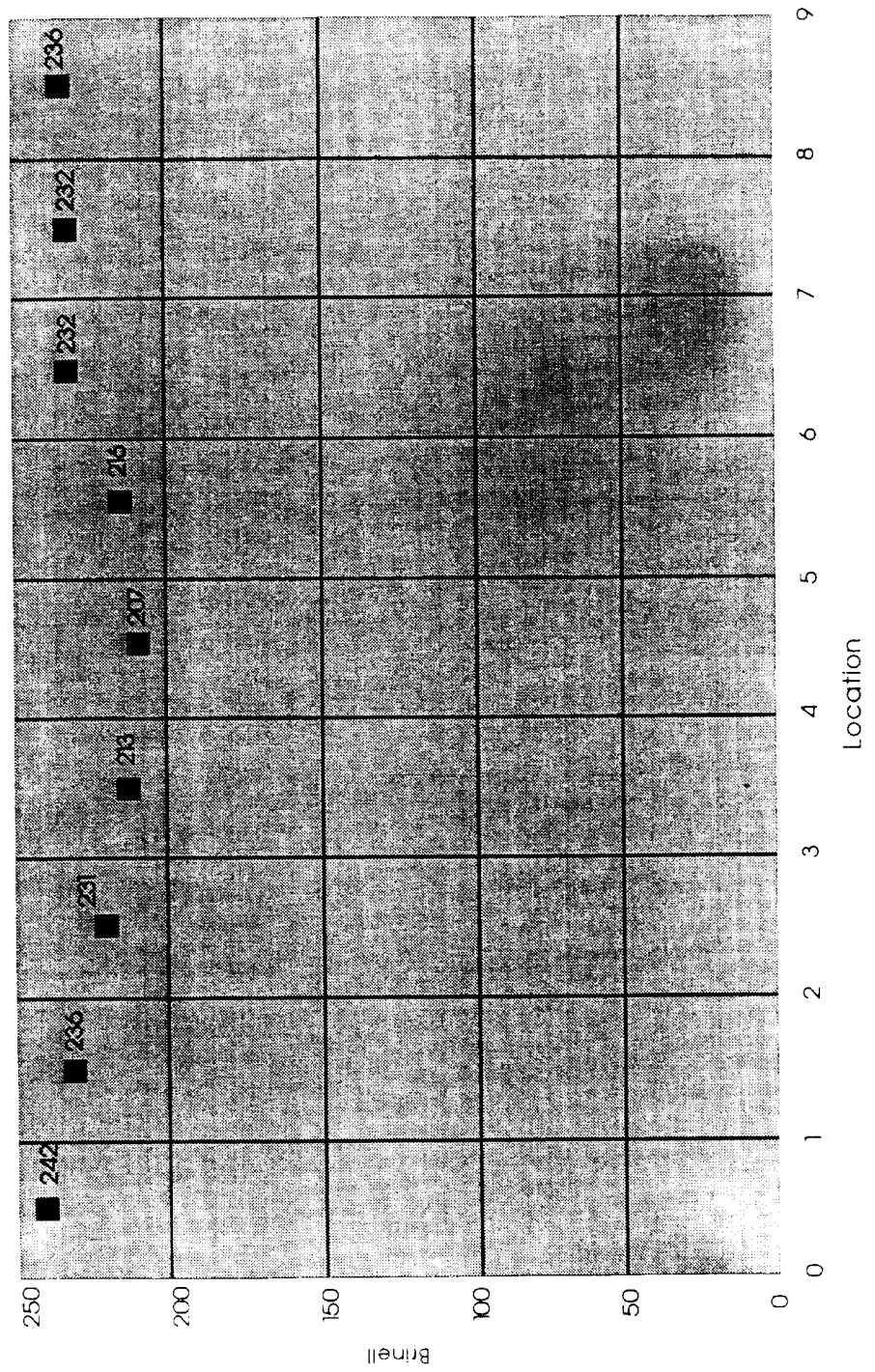
FIG. 4 is a hardness drop-off graph which illustrates a hardness traverse across a 9" thick section of the new product.

Extensive experience has shown that the drop in hardness from surface to one inch below the surface in a 9" cross section of a piece of conventional material, such as 8620 or 4140, is a drop of 50 HB. From FIG. 4, which is a traverse entirely across a 9" thick section of material of the present invention, the hardness drop-off is only about 30 HB.

The new steel also has a very good yield to tensile ratio, good ductility, good toughness and twice the strength and hardness of aluminum as will be seen from the following:

| Longitudinal Properties 9" Thick Piece - Surface Sample | | | | | |
|---|---|---|---|---|---|
| BHN | Yield | UTS | Elong. | RA | CVN |
| 240 | 93,200 | 109,600 | 23.5% | 60.7% | 60 ft-# |

As earlier alluded to, frequently, if not nearly universally, prototype toy molds, as well as molds for literally thousands of other plastic products, must be welded during their evolution into their final form, and hence good welding characteristics of the mold material is a necessity. In this connection the area of interest is the HAZ, or Heat Affected Zone, of the material, which area is almost invariably only a portion of a complete piece.

Magnification analysis has shown that the steel of the invention has a microstructure which is less sensitive to hydrogen damage than the conventional steel. Further, typically the invention steel does not harden from the heat of welding. Indeed the invention steel may soften depending on the interpass temperature and cooling rate. This characteristic is attributable to the dissolution of copper and grain coarsening. And, further, the interpass temperature of the steel of the invention is only a fraction of the interpass temperature of other steels used for prototype molds. Most significantly, post-heating of the invention product is not required. These advantages are clearly seen in the following table which compares the preheat, interpass and post-heat requirements of the conventional steel, 4140 steel, and the steel of this invention.

Comparison of Welding Parameters

|  | Conventional Steel | 4140 | Invention Steel |
|---|---|---|---|
| Preheat | 500–700° F. | 400–600° F. | 200–300° F. |
| Interpass | 650° F. | 600° F. | 200–300° F. |
| Postheat | 950° F. | 500° F. | not required |

Taking all of the foregoing into consideration, the steel of this invention is the most easily weldable steel as is shown in FIG. 5.

It should also be noted that the steel of the invention has good polishability. Samples of the invention steel provided to a polishing shop were reported (a) to polish easier than aluminum, (b) to readily accept a "High Polish" and (c) were rated as a Society of the Plastics Industry, mold finish guide A2; i.e.: SPI A2 finish at approximately No. 6 diamond buff.

And finally, the thermal expansion characteristics of the invention steel are very advantageous in that they are very similar to the thermal expansion characteristics of the conventional steel. This has the advantage that CNC machining programs developed for prototype molds can be used without adjustment or compensation for thermal expansion in the building of production molds. By contrast, aluminum has approximately 1.85 times the thermal expansion of both the new steel and the conventional steel so that, if the mold maker elects to make prototype molds from aluminum or aluminum alloy, and the final production molds from steel alloy, time consuming and precise adjustments must be made to take into account thermal expansion differences resulting from use of the steel at elevated temperatures.

In summary it will be noted that the new steel shares many of the same characteristics of precipitation hardening grades. Some of those characteristics are uniform hardness distribution from surface to center of large cross sections, low residual stresses (since hardening is not dependent on high cooling rates), and high temperature strength due to the stability of precipitates versus the continuing tempering reactions of martensitic grades of mold steel. These characteristics also make the new steel a viable candidate for isothermal forging dies for aluminum components. These dies usually run at 800° F.—a temperature that causes significant loss of strength in traditional die steels.

Although a specific embodiment of the invention has been illustrated and described, it will at once be apparent to those skilled in the art that modifications and variations may be made without departing from the spirit and scope of the invention. Accordingly it is intended that the scope of the invention be limited not solely by the scope of the foregoing description but primarily by the scope of the hereafter appended claims when interpreted in light of the relevant prior art.

I claim:

1. A steel mold for plastic prototyping having, after solution treatment and ageing in the range of from about 600° F. to about 1400° F.,
   a. hardness in the range of 200–250 BHN,
   b. yield to ultimate ratio in the range of on the order of about 75% to 85%,
   c. reduction in area in the range of on the order of about 60% to 70%,
   d. elongation in the range of on the order of about 19% to 27%,
   e. a decrease in hardness from surface to center in thick cross sections of no more than about 30 BHN,
   f. substantially equal machining tool life as aluminum alloys at machining speeds up to 70% of aluminum alloy machining speeds,
   g. a decrease in yield strength at an elevated temperature of about 800° F. of no more than about 15% compared to room temperature yield strength,
   h. a welding profile of no more than about 300° F. for preheating and interpass heating, and no post-heating,
   i. polishability of at least SPI A2, and
   j. the ability to harden at elevated working temperatures.

2. The plastic prototyping steel mold of claim 1 further characterized in that,
   firstly, the mold is precipitation hardening, and
   secondly, in that C is present in an amount sufficient to attain the foregoing characteristics up to about 0.35%.

3. The plastic prototyping steel mold of claim 2 further characterized in that C is present up to about 0.20%.

4. The plastic prototyping steel mold of claim 2 further characterized in that the mold material has the following approximate composition by weight percent:

| C | .05–.35 |
|---|---|
| Mn | .50–1.50 |
| P | .025 max |
| S | .100 max |
| Si | .50 max |
| Ni | .35–.75 |
| Mo | .30–.70 |
| Cu | .75–1.50 |
| Al | .20 max |
| Fe | balance, including incidental impurities and additional elements which do not deleteriously affect the foregoing characteristics |

5. The plastic prototyping steel mold of claim 3 further characterized in that the mold material has the following approximate composition by weight percent:

| C | .15–.20 |
|---|---|
| Mn | .60–.80 |
| P | .025 max |
| S | .010–.025 |
| Si | .15–.35 |
| Ni | .40–.60 |
| Mo | .43–.57 |
| Cu | .85–1.15 |
| Al | .03–.15 |
| Fe | balance, including incidental impurities and additional elements which do not deleteriously affect the foregoing characteristics |

6. The plastic prototyping steel mold of claim 5 further characterized in that the mold material has the following approximate composition by weight percent:

| | |
|---|---|
| P | .015 max |
| S | .010–.020 |
| Ni | .40–.50 |
| Al | .03–.09 |

7. An alloy steel having the following approximate composition by weight percent:

| | |
|---|---|
| C | .05–.35 |
| Mn | .50–1.50 |
| P | .025 max |
| S | .100 max |
| Si | .50 max |
| Ni | .35–.75 |
| Mo | .30–.70 |
| Cu | .75–1.50 |
| Al | .20 max |
| Fe | balance, including incidental impurities and additional elements which do not deleteriously affect the performance of the steel following solution treatment and ageing in the range of from on the order of about 600° F. to about 1400° F. |

8. The alloy steel of claim 7 further characterized in that the steel has the following approximate composition by weight percent:

| | |
|---|---|
| C | .15–.20 |
| Mn | .60–.80 |
| P | .015 max |
| S | .010–.020 |
| Si | .15–.35 |
| Ni | .40–.50 |
| Mo | .43–.57 |
| Cu | .85–1.15 |
| Al | .03–.09 |
| Fe | balance, including incidental impurities and additional elements which do not deleteriously affect the performance of the steel following solution treatment and ageing in the range of from on the order of about 600° F. to 1400° F. |

9. A method of manufacturing a plastic prototype steel mold having, after solution treatment and ageing in the range of from on the order of about 600° F. to 1400° F., and a. hardness in the range of 200–250 BHN, b. yield to ultimate ratio in the range of on the order of about 75% to 85%, c. reduction in area in the range of on the order of about 60% to 70%, d. elongation in the range of on the order of about 19% to 27%, e. a decrease in hardness from surface to center in thick cross sections of no more than about 30 BHN, f. substantially equal machining tool life as aluminum alloys at machining speeds up to 70% of aluminum alloy machining speeds, g. a decrease in yield strength at an elevated temperature of about 800° F. of no more than about 15% compared to room temperature yield strength, h. a welding profile of no more than about 300° F. for preheating and interpass heating, and no post-heating, i. polishability of at least SPI A2, and j. the ability to harden at elevated working temperatures, the steps of forming a melt of steel to yield the following approximate final composition:

| | |
|---|---|
| C | .05–.35 |
| Mn | .50–1.50 |
| P | .025 max |
| S | .100 max |
| Si | .50 max |
| Ni | .35–.75 |
| Mo | .30–.70 |
| Cu | .75–1.50 |
| Fe | balance, including incidental impurities and additional elements which do not deleteriously affect the foregoing characteristics | subjecting the melt in a post melting treatment step to the effects of a vacuum sufficiently low to remove significant quantities of H and 0, a purging gas and an alternating current electric heating arc, and adding Al in an amount sufficient to yield a final quantity of 0.20 max during or after the aforesaid subjection of the melt to vacuum, purging and the heating arc, and processing the said steel, in a solid condition, into a prototype steel mold.

10. The method of claim 9 further characterized firstly, in that the melt is subjected to the effects of vacuum, purging and the heating arc simultaneously during at least a portion of the time that the melt is subjected to post-melting treatment, and secondly, in that Al is added after the post-melting treatment step of vacuum, purging and an AC arc in an amount to yield a final quantity, by weight percent, of 0.20 max.

11. The method of claim 10 further characterized in that the alloy steel, after solidification but before processing into a prototype mold, is vacuum arc remelted, following which it is processed, in a solid condition, into a prototype mold.

12. A steel implement for isothermal forging of aluminum having, after solution treatment and ageing in the range of from about 600° F. to about 1400° F., a. hardness in the range of 200–250 BHN, b. yield to ultimate ratio in the range of on the order of about 75% to 85%, c. reduction in area in the range of on the order of about 60% to 70%, d. elongation in the range of on the order of about 19% to 27%, e. a decrease in hardness from surface to outer in thick cross sections of no more than about 30 BHN, f. substantially equal machining tool life as aluminum alloys at machining speeds up to 70% of aluminum alloy machining speeds, g. a decrease in yield strength at an elevated temperature of about 800° F. of no more than about 15% compared to room temperature yield strength, h. a welding profile of no more than about 300° F. for preheating and interpass heating, and no post-heating, i. polishability of at least SPI A2, and j. the ability to harden at elevated working temperatures.

13. The steel implement of claim 12 further characterized in that, firstly, the steel precipitation hardening, and secondly, in that C is present in an amount sufficient to attain the foregoing characteristics up to about 0.35%.

14. The steel implement of claim 13 further characterized in that C is present up to about 0.20%.

15. The steel implement of claim 13 further characterized in that the implement material has the following approximate composition by weight percent:

| | |
|---|---|
| C | .05–.35 |
| Mn | .50–1.50 |
| P | .025 max |
| S | .100 max |
| Si | .50 max |
| Ni | .35–.75 |
| Mo | .30–.70 |
| Cu | .75–1.50 |
| Al | .20 max |
| Fe | balance, including incidental impurities and additional elements which do not deleteriously affect the foregoing characteristics |

16. The steel implement of claim 15 further characterized in that the implement material has the following approximate composition by weight percent:

| | |
|---|---|
| C | .15–.20 |
| Mn | .60–.80 |
| P | .025 max |
| S | .010–.025 |
| Si | .15–.35 |
| Ni | .40–.60 |
| Mo | .43–.57 |
| Cu | .85–1.15 |
| Al | .03–.15 |
| Fe | balance, including incidental impurities and additional elements which do not deleteriously affect the foregoing characteristics |

17. The steel implement of claim 16 further characterized in that the implement material has the following approximate composition by weight percent:

| | |
|---|---|
| P | .015 max |
| S | .010–.020 |
| Ni | .40–.50 |
| Al | .03–.09 |

18. In a method of manufacturing a steel die for isothermal forging of aluminum having, after solution treatment and ageing in the range of from on the order of about 600° F. to 1400° F., and
   a. hardness in the range of 200–250 BHN,
   b. yield to ultimate ratio in the range of on the order of about 75% to 85%,
   c. reduction in area in the range of on the order of about 60% to 70%,
   d. elongation in the range of on the order of about 19% to 27%,
   e. a decrease in hardness from surface to outer in thick cross sections of no more than about 30 BHN,
   f. substantially equal machining tool life as aluminum alloys at machining speeds up to 70% of aluminum alloy machining speeds,
   g. a decrease in yield strength at an elevated temperature of about 800° F. of no more than about 15% compared to room temperature yield strength,
   h. a welding profile of no more than about 300° F. for preheating and interpass heating, and no post-heating,
   i. polishability of at least SPI A2, and
   j. the ability to harden at elevated working temperatures
the steps of forming a melt of steel to yield the following approximate final composition:

| | |
|---|---|
| C | .05–.35 |
| Mn | .50–1.50 |
| P | .025 max |
| S | .100 max |
| Si | .50 max |
| Ni | .35–.75 |
| Mo | .30–.70 |
| Cu | .75–1.50 |
| Fe | balance, including incidental impurities and additional elements which do not deleteriously affect the foregoing characteristics | subjecting the melt in a post melting treatment step to the effects of a vacuum sufficiently low to remove significant quantities of H and 0, a purging gas and an alternating current electric heating arc, and adding Al in an amount sufficient to yield a final quantity of 0.20 max during or after the aforesaid subjection of the melt to vacuum, purging and the heating arc, and processing the said steel, in a solid condition, into a die.

19. The method of claim 18 further characterized firstly, in that the melt is subjected to the effects of vacuum, purging and the heating arc simultaneously during at least a portion of the time that the melt is subjected to post-melting treatment, and secondly, in that Al is added after the post-melting treatment step of vacuum, purging and an AC arc in an amount to yield a final quantity, by weight percent, of 0.20 max.

20. The method of claim 19 further characterized in that the alloy steel, after modification but before processing into a die, is vacuum arc remelted, following which it is processed, in a solid condition, into a die.

* * * * *